No. 739,099. PATENTED SEPT. 15, 1903.
J. L. MULLER & J. BONNET.
MACHINE FOR MANUFACTURING INCANDESCENT MANTLES.
APPLICATION FILED NOV. 11, 1901.
NO MODEL. 9 SHEETS—SHEET 1.

WITNESSES:
INVENTORS
ATTORNEYS.

No. 739,099. PATENTED SEPT. 15, 1903.
J. L. MULLER & J. BONNET.
MACHINE FOR MANUFACTURING INCANDESCENT MANTLES.
APPLICATION FILED NOV. 11, 1901.
NO MODEL. 9 SHEETS—SHEET 3.

WITNESSES:

INVENTORS
Jean Léon Muller
and Joseph Bonnet
BY
ATTORNEYS.

No. 739,099. PATENTED SEPT. 15, 1903.
J. L. MULLER & J. BONNET.
MACHINE FOR MANUFACTURING INCANDESCENT MANTLES.
APPLICATION FILED NOV. 11, 1901.
NO MODEL. 9 SHEETS—SHEET 4.

WITNESSES:
INVENTORS
ATTORNEYS.

No. 739,099. PATENTED SEPT. 15, 1903.
J. L. MULLER & J. BONNET.
MACHINE FOR MANUFACTURING INCANDESCENT MANTLES.
APPLICATION FILED NOV. 11, 1901.
NO MODEL. 9 SHEETS—SHEET 5.

FIG. 5.

No. 739,099. PATENTED SEPT. 15, 1903.
J. L. MULLER & J. BONNET.
MACHINE FOR MANUFACTURING INCANDESCENT MANTLES.
APPLICATION FILED NOV. 11, 1901.
NO MODEL. 9 SHEETS—SHEET 8.

WITNESSES:
C. Bradway
Henry Suhrbier

INVENTORS
Jean L. Muller
Joseph Bonnet
BY
Jaques Niles
ATTORNEYS.

No. 739,099. Patented September 15, 1903.

UNITED STATES PATENT OFFICE.

JEAN LÉON MULLER AND JOSEPH BONNET, OF PARIS, FRANCE.

MACHINE FOR MANUFACTURING INCANDESCENT MANTLES.

SPECIFICATION forming part of Letters Patent No. 739,099, dated September 15, 1903.

Application filed November 11, 1901. Serial No. 81,858. (No model.)

*To all whom it may concern:*

Be it known that we, JEAN LÉON MULLER and JOSEPH BONNET, citizens of the Republic of France, and residents of Paris, France, have invented a new and useful Improvement in Machines for the Manufacture of Incandescent Mantles, which is fully set forth in the following specification.

This invention relates to machines used for the manufacture of incandescent mantles, and more specifically to improvements in a machine as shown in our copending application, Serial No. 39,550, filed December 11, 1900.

The object of the invention is to provide a machine in which several mantles arranged in rows undergo the same stage of treatment at the same time, whereby the capacity of the machine is made considerably larger than those heretofore in use, whereby a larger output is attained.

In the improved machine the mantles are intermittently fed into and moved in the same at regular intervals of short duration, during which the mantles are subjected successively to a preliminary burning off, a calcination, trimming, immersion in collodion, and drying.

For this purpose the invention consists of a machine for manufacturing incandescent mantles comprising a suitable frame, guideways at the interior of said frame, pulleys at each end of the frame, endless conveying-chains passing over said pulleys, transverse carriers adapted to be carried in pairs by said endless chains and movable in the guideways of the frame, a plurality of supporting-rods arranged on one of each pair of carriers, a plurality of crown-supports arranged on the other of each pair of carriers, means for intermittently moving said endless conveying-chains from one end of the machine to the other, and means for transferring said supporting-rods and crown-supports from one length of the conveying-chains to the other.

The invention consists, further, of means for trimming the mantles after the same have been calcined in the machine.

The invention consists, finally, of certain novel features of construction and combination of parts, which will be more fully described hereinafter and finally pointed out in the claims.

In the accompanying drawings, Figures 1 and 1ª are disconnected views of a side elevation of a machine embodying our invention.

Similar characters of reference indicate corresponding parts.

Figure 1:
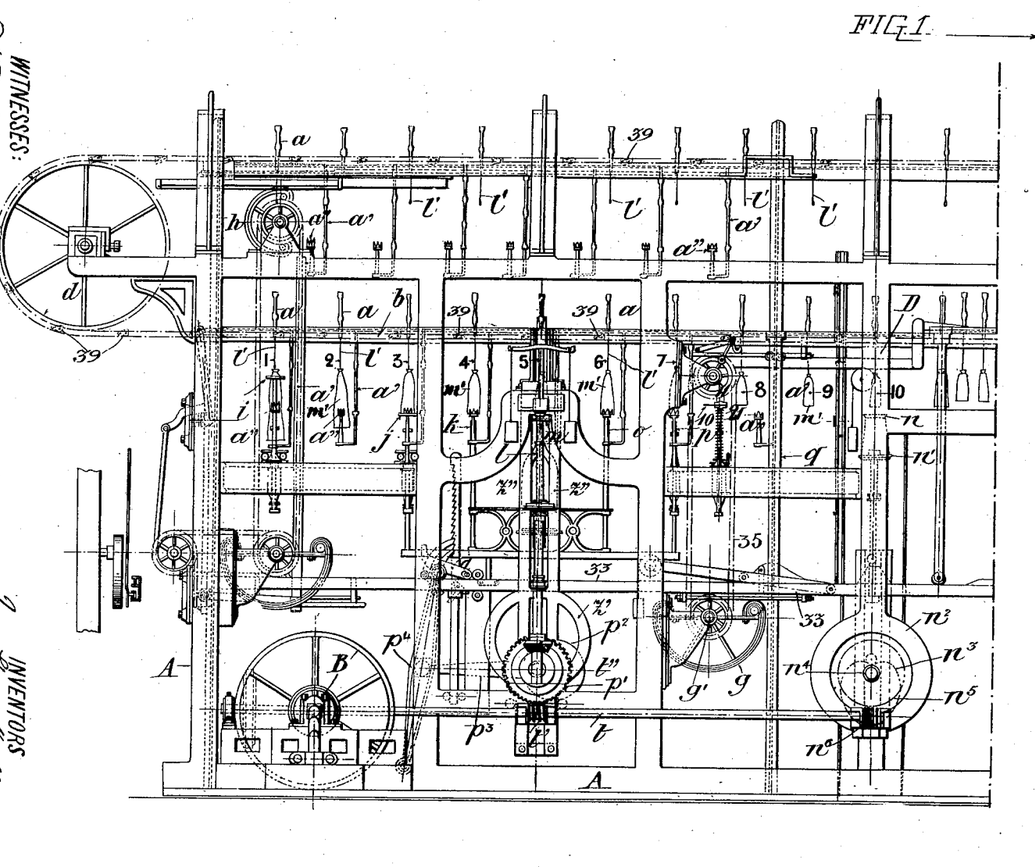
Figure 1A:
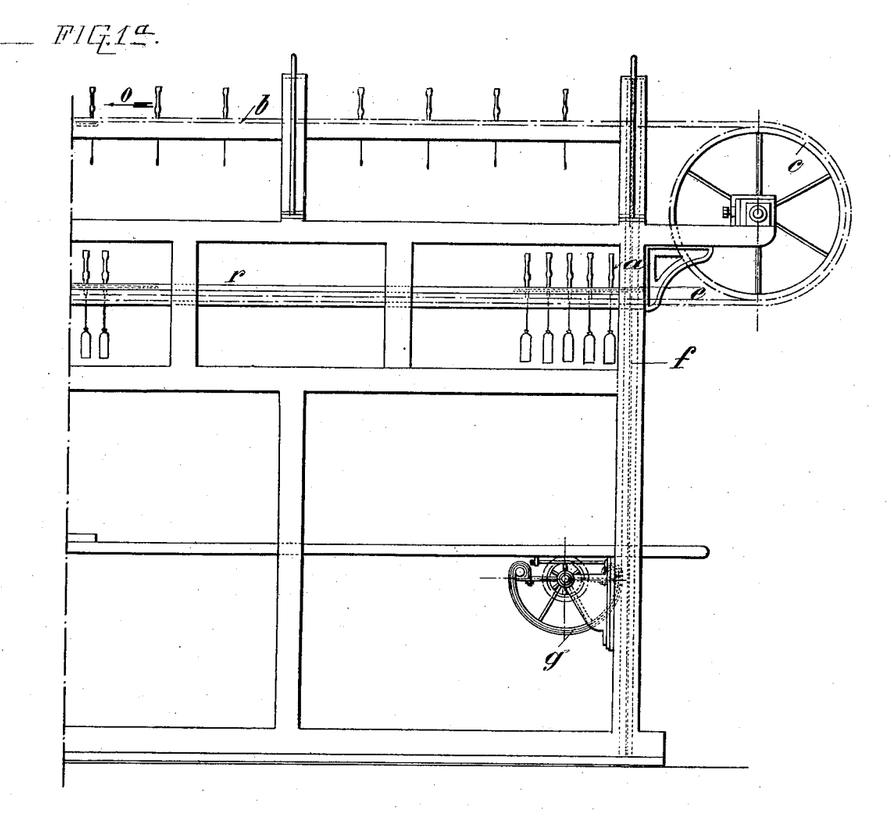

Referring to the drawings, A represents the frame of the machine, the left-hand part of which, as shown in Fig. 1, supports the mechanisms for the various operations of the machine, and the right-hand part of which comprises a drying-chamber $r$, the details of which, however, are not shown, as they are not an essential feature of the invention. At the ends of the machine, at the upper parts thereof, are suitably-supported pulley-wheels $c$ and $d$, which are arranged in pairs, so as to support two endless conveying-chains $b$ along the front and back part of the machine, which chains $b$ are provided with plates 39 on the inner circumference and are equidistantly apart. The power-transmitting mechanism B is arranged at the left hand of the machine and transmits its motion to an auxiliary shaft $t$, provided with a worm $t'$, meshing with a worm-gear $p'$, mounted on a shaft $t''$, on which is also mounted an eccentric $p^2$, connected with an eccentric-rod $p^3$, which in turn moves the oscillating rod $p^4$, which is connected with a bar 33 and transmits to the same oscillatory or to-and-fro motion. The bar 33 (referring to Fig. 12) is provided with means for transforming rectilinear motion to circular, which circular motion is again transformed into rectilinear motion for intermittently moving the conveying-chain. These transforming means may be any well-known means, as bow and fiddle, pinion and rack, &c.

Figure 6:
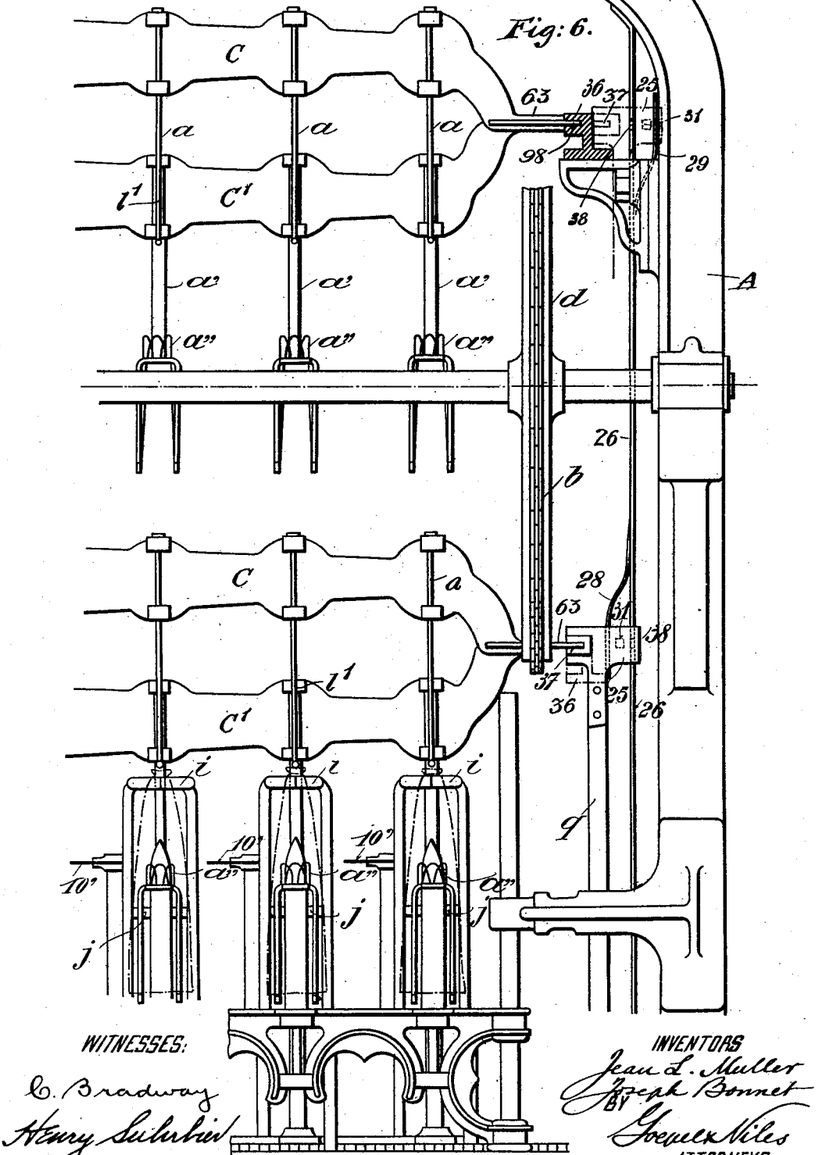
Fig. 6 is an end view of the right-hand upper side of the machine, showing the means for raising the crown-supports from the lower length of the conveying-chains to the upper, in which the upper part of the pulley and chain is broken away to show more clearly the guideways for the carriers in the frame of the machine.
Figure 7:
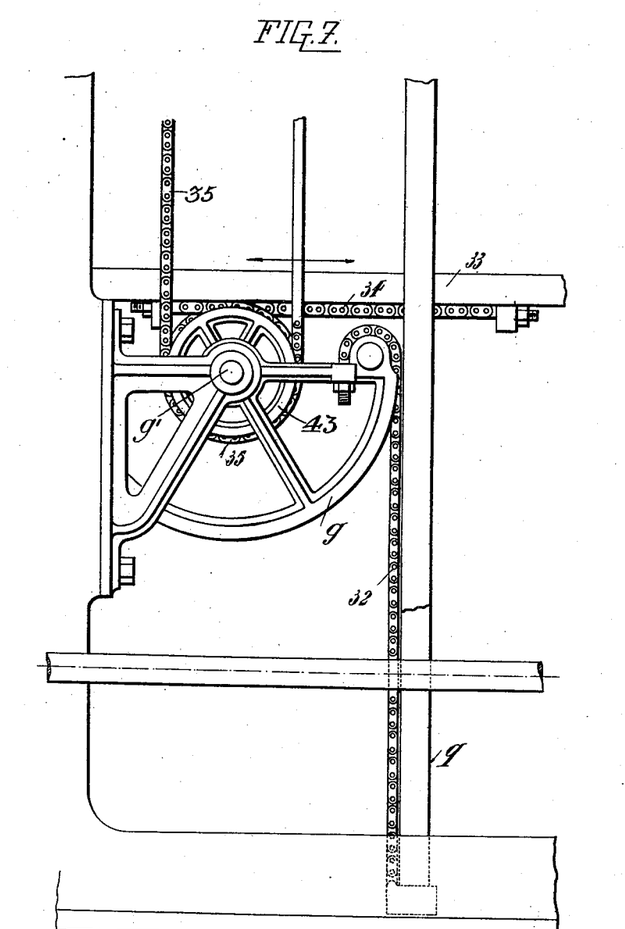
Fig. 7 is a detail view of the mechanism for moving the rods which elevate the crown-supports.
Figure 12:
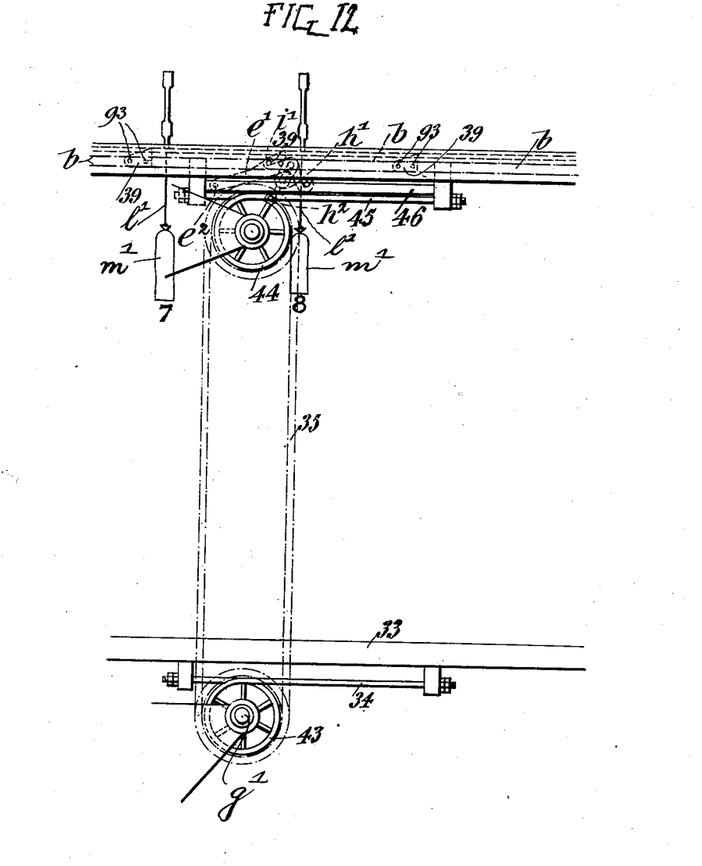
Fig. 12 is a detail view of the mechanism for imparting to the endless conveying-chain an intermittent motion for transferring the mantles from one end of the machine to the other from one periodical stage of treatment to another.

Referring to Figs. 7 and 12, the rack 34, attached to the bar 33, meshes with a wide gear-wheel 43, mounted on a shaft $g'$, and over which passes a chain 35, which passes also over a similar gear-wheel 44, which in turn also meshes with a rack 45, mounted on a frame 46, movable in guideways in proximity to the guideways 36 of the machine. The to-and-fro motion of the rack 34 causes the wheel 43 to rotate alternately in opposite directions, and this motion is transmitted to the wheel 44 and in turn to the rack 45 and frame 46. The frame 46 is provided with a hook-shaped part $e'$, which is pivoted at $e^2$ to the frame and connected by a slotted rod $h'$, engaging with a point $h^2$ of the wheel 44. The part $e'$ is provided with a recess $i'$, which is adapted to engage the pins 93 of the plates 39, secured to the chain $b$ at certain distances apart, corresponding to the amount of motion desired to be given to the mantles from one stage of operation to the other. It is readily seen that the motion of the rack 45, with the frame 46, provided with the recessed part $e'$, engaging the pins 93 of the plates 39, to the right will move the conveying-chains $b$ a distance equal to the oscillatory motion of the racks 34 and 45. The pins 93 are adapted to engage with and move the transverse carriers C and C', the ends 63 of which move in grooves 98 of suitable guideways 36, (shown in Fig. 6,) which are supported longitudinally the entire length of the machine on the front and rear portions of the frame, approximately level with the upper and lower lengths of the chains $b$.

On the carriers C are arranged supporting-rods $a$, provided with links $l'$, supporting the mantles $m'$, and upon the carriers C' are arranged crown-supports $a'$, which are curved at their lower parts and provided with crowns $a''$, of platinum wire or other suitable metal. The crowns $a''$ serve to maintain the mantle $m'$, held by the supporting-rods $a$, in open position during the burning-off and calcining operations and while being moved from one place of operation to another.

Figure 9:
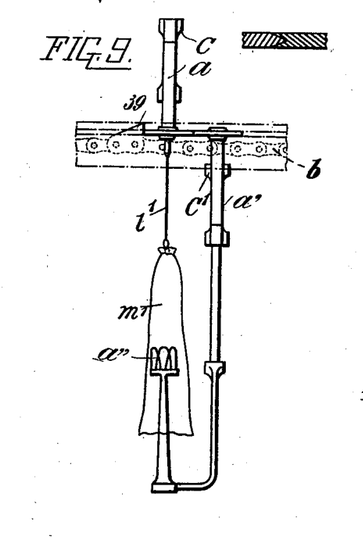
Fig. 9 is a detail view showing the carriers, each of which is provided with a mantle-supporting rod and a crown-support, also showing the conveying-chain provided with a stop for moving the carriers.

The transverse carriers C and C', with their supporting-rods and crown-supports, are adapted to be moved together one before the other, as shown in Fig. 9, by being engaged by the pins 93 on the plates 39 of the endless chains $b$ from the left-hand part of the machine to the right-hand part as far as the rod $g$, where the crown-supports $a'$ are elevated, while the mantle-supporting rods $a$, with mantles $m'$ appending, continue to move to the right of the machine to the elevating-rod $f$, where they are elevated to the upper lengths of the conveying-chains $b$ and moved thereby again to the feed end or left-hand side of the machine.

Figure 10:
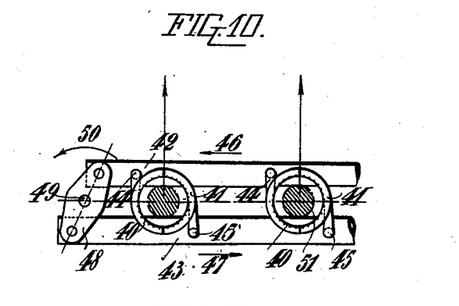
Figs. 10 and 11 are detail views of the burners, showing the same in different positions relative to the mantles.
Figure 11:
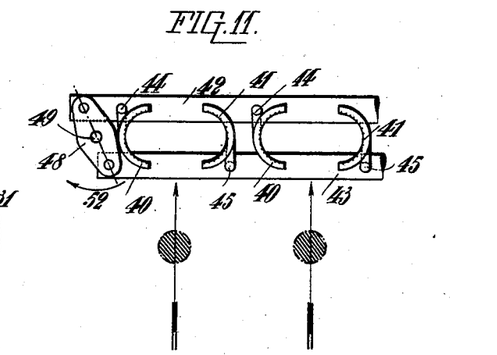

The various stages of operation of the machine are as follows: preliminary burning of the mantles, which is threefold, calcining of the same, which is fourfold, trimming to the desired length or standard, followed by immersion and drying, which operations take place successively from the left or feed end of the machine to the right or discharge end thereof. By means of the mechanism described the conveying-belt $b$ is moved intermittently with stoppages of one minute's duration, during which stoppages the processes of burning, calcining, and trimming successively take place. The mantles having been suitably attached to the supporting-rods $a'$ are moved by the intermittent motion of the belts $b$ to the first stoppage 1 of Fig. 1, whereby the mantles $m'$ are subjected to circular flames of gas $i$ and there are ignited from the top and burned downwardly over the whole circumference of the mantle during the stoppage. From the position shown at 1 the mantles are moved by the next intermittent motion of the chains to the position 2, where they continue to burn from above downwardly without being submitted to the action of flames. From the position 2 they are moved to the position 3, where they still continue to burn and where, if desired, they may be subjected to circular jets $j$, which direct their flames to the lower part of the mantle, which subjection is, however, only precautionary and generally unnecessary. The mantles are ignited at 1 and 3 by burners 40 and 41, (shown in Figs. 10 and 11,) semi-annular in shape and provided with jet-apertures at their interior portions. These burners are adapted to fit around the mantle and are mounted on parallel pipes 42 and 43, that are connected with the burners 40 and 41, respectively, by connecting-pipes 44 and 45. The pipes 42 and 43, having suitable connection with a source of gas-supply, are supported on the frame A of the machine in any desirable manner and are adapted to move longitudinally in opposite directions relatively to each other by means of links 48, that are actuated on pivots 49. By means of this arrangement the semi-annular burners 40 and 41 can be separated to a suitable distance for the entrance and the exit of the mantles, and when returned to their normal position are arranged concentrically around the mantles, so that the flames of the burners will play evenly on the surface of the mantles. After the preliminary burning of the mantles at the positions 1, 2, and 3 they are moved by the intermittent motion of the chains $b$ to a position 4 and there submitted to the action of burners $k$, which act on the interior of the mantles with powerful flames, so as to harden the mantles. These flames, owing to the arrangement of the burners, distribute their heat uniformly over the different parts of the mantles. The mantles are then moved to the position 5, where they are subjected to interior and exterior flames at the same time from the burners $l$ and $m$. This is the most intense period of calcination, as the mantles are acted upon by powerful flames internally and externally at the same time. The burners $l$ and $m$ are of the annular Bunsen type, and the burner $m$ is similar to the construction before described for the burners $i$ and $j$, used in the preliminary heating and shown in Figs. 10 and 11. The intermittent motion of the chains $b$ moves the mantles from the position 5 to the position 6, where they are again submitted to the action of flames coming from the burner $o$, which action is similar to the action of the burner $k$ at the position 4, and which action is internal, so as to complete the hardening of the mantles, and finishes the calcining operation.

Figure 4:
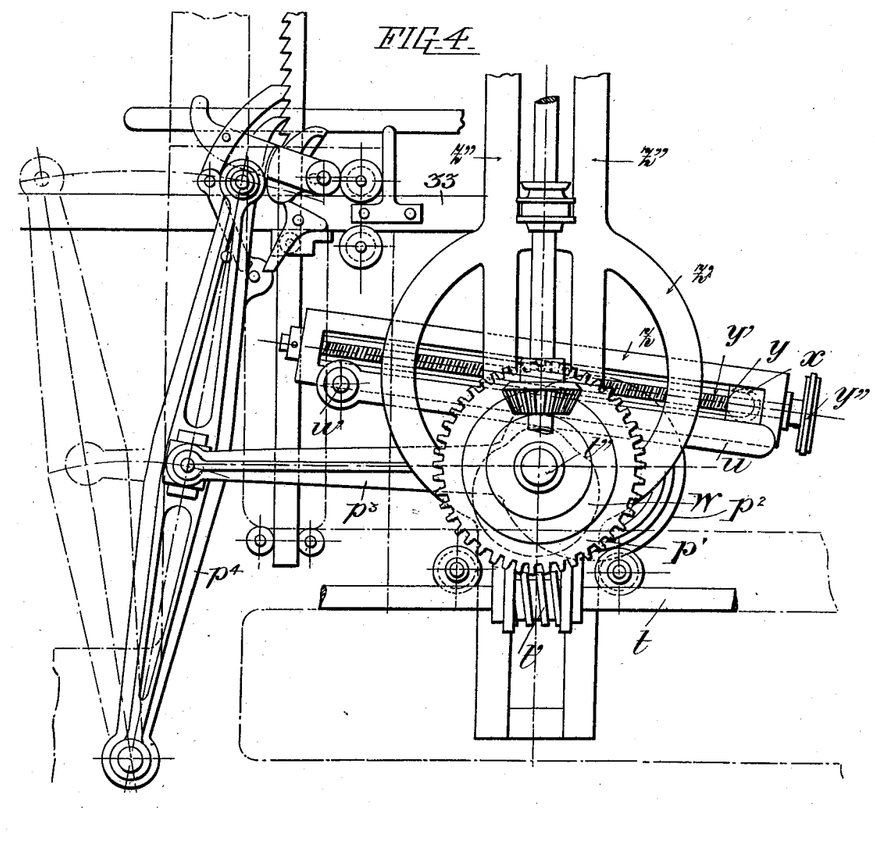
Fig. 4 is an enlarged view in elevation of means for adjusting the calcining-burner to the proper relation to the mantles.

The burners $k$, $l$, $m$, and $o$ are arranged in such a manner as to be vertically movable along the mantle, so as to distribute the action of the flames equally over every part, for which movement a suitable mechanism is provided, which is shown in Fig. 4. Mounted on the shaft $t''$ is a cam W, which actuates when the shaft $t''$ is rotated a frame $z'$, provided with an extension $z''$, on which are mounted the burners $k$, $l$, $m$, and $o$, and which by the rotation of the shaft $t''$ are given a vertical rectilinear motion. According to the length of the mantle, the movement of the extension-frame $z''$ is regulated by means of a lever $u$, pivotally mounted on the frame A of the machine at $u'$, and which acts upon a bearing $x$, that is shiftable in the frame $z$, arranged on the extension-frame $z''$, as shown in Fig. 4. By causing the bearing $x$ to move relatively to the pivotal mounting $u'$ the action of the lever $u$ upon the same can be regulated, so as to adjust the length of the movement of the burner-carrying extension-frame $z''$. The adjustment of the bearing $x$, which is arranged in a guide-box $y$, is effected by a screw $y'$, that is operated by a hand-wheel $y''$. Hence by the movement of the wheel $y''$ the amount of vertical rectilinear motion of the burners $k$, $l$, $m$, and $o$ may be regulated.

Figure 2:
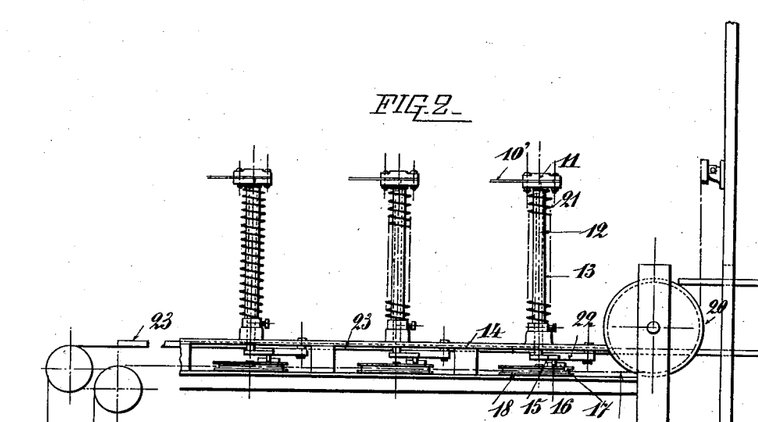
Fig. 2 is an elevation of the mantle-trimming mechanism.
Figure 3:
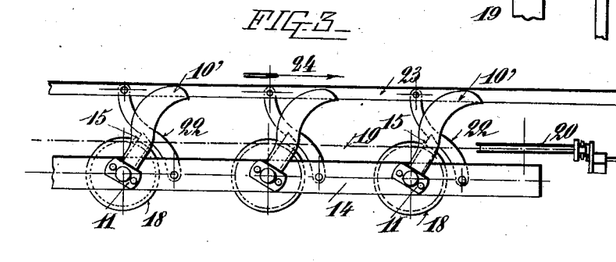
Fig. 3 is a top view of said mechanism.

After the calcining operations at 4, 5, and 6 the mantles are moved by the intermittent motion of the chains $b$ to the position 7, where the hardening of the mantles is completed by the action of the flames from the burner $p$, which subjects the mantles to a final burning as a precautionary measure, so as to complete the hardening. The latter burning may be dispensed with and the mantles simply maintained at rest at the position 7, from which they are moved to the position 8, during which movement the mantles are trimmed at their lower edges, which are more or less ragged and which would for this reason render the mantles unusable. The mantles are trimmed between positions 7 and 8 in Fig. 1 by means of trimming devices the details of which are shown in Figs. 2 and 3. Referring to Figs. 2 and 3, the trimming-knives 10' are secured in heads 11, that are arranged in the upper ends of vertical shafts 12, guided in sleeves 13. These sleeves 13 are arranged on the frame of the machine in a line extending transversely of the machine and are arranged below the mantles. The lower ends of the shafts 12 are provided with cranks 15, the outer ends of which are provided with pieces 16, that engage with contact-pieces 17, arranged on pulley-wheels 18. Springs 21 are arranged around the sleeve 13 and have one of their ends secured to heads 11 of the shaft 12 and their other end secured to the fixed transverse support or frame 14. By rotating the pulleys 18, the plates 17 of which engage the pins 16 of the cranks 15, the springs are placed under tension and maintained in such condition by means of links 22 engaging with the outer ends of the cranks 15. The links 22 are connected with rods 23, so that by moving the latter the cranks are released, and the knives are rapidly actuated under the influence of the springs 21. It is essential that the trimming operation be performed in a quick manner. For this reason the knives are placed under spring tension, so that the operation takes place with sufficient force and rapidity, so as to make a clean cut of the edges. Suitable connection of the trimming devices with the power-transmitting mechanism may be made in any suitable manner through the wheel 20 and pulley 18. The trimmed mantles then arrive at position 8, and the crown-supports $a''$ are elevated by the rods $q$, while the mantles on the mantle-supporting rods are moved by the next intermittent motion to the position 9, where they are not subjected to any action.

Figure 5:
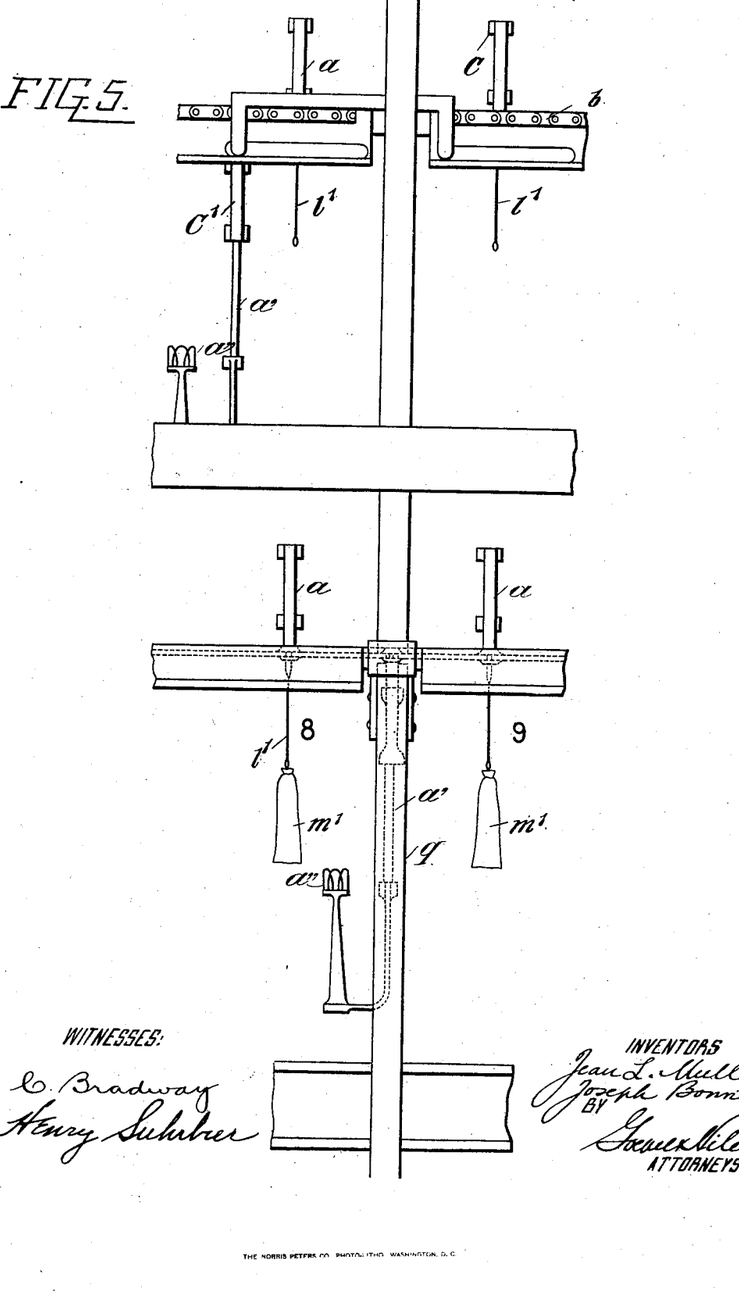
Fig. 5 is a side elevation of a part of the machine, showing the means used for transferring the crown-supports from the lower length of the endless conveying-chain to the upper length of the same.
Figure 8:
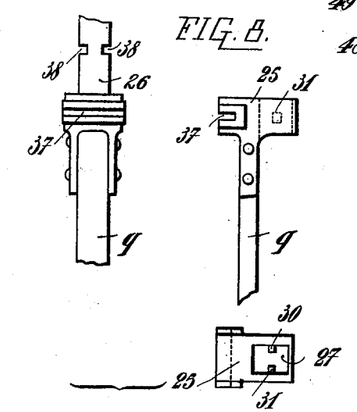
Fig. 8 shows detail views of the heads of the rods for raising the crown-supports.

The transferring of the crown-supports $a'$ from the lower lengths of the chains $b$ to the upper lengths is accomplished by the intermediate transferring mechanism. (Shown in Figs. 5, 6, and 7.) The several transferring mechanisms $q$, $f$, and $h$ being of similar construction, the description of one, $q$, will suffice for the others. As a means of comparison, however, the rods $q$ move upwardly and raise the crown-supports $a'$. The rods $f$ also move upwardly and raise the mantle-supporting rods $a$, while the rods $h$ move downwardly for lowering the mantle-supporting rods $a$ and the crown-supports $a'$. At the front and back part of the machine are arranged vertical rods $q$, the upper ends of which are provided with head-pieces 25 (shown in detail in Fig. 8) and guided by vertical guide-rods 26, fastened to the frame of the machine. The lower ends of the rod $q$ are connected by chains with the sector-wheels $g$, that are mounted on the shaft $g'$, on which is mounted the wide gear-wheel 43, (shown in Fig. 7,) meshing with the rack 34, attached to the oscillating bar 33, before described, the oscillating bar 33 causing the vertical to-and-fro movements of the rods $q$. The inner portions of the heads 25 of the rods $q$ are provided with transverse grooves 37 and the back portions are provided with vertical ways 27, that have lugs 30 and 31 projecting inwardly at opposite sides. On the guide-rods 26 are arranged springs 28 and 29 of suitable curvature and of smaller width than the distance between the lugs 30 and 31 of the heads 25 of the rods $q$. When the rods $q$ are in their lowered position, the heads 25 are approximately in the same plane as the lower lengths of the conveying-chains $b$ and the grooves 37 of the heads 25 form continuations to the guideways 36 of the inner side of the frame of the machine, in which the projecting ends 63 of the carriers $C'$ move during the intermittent motion given to the same by the conveying-chains $b$. In this lower position, as shown in Fig. 6, the heads 25 are pressed inwardly toward the center of the machine by the springs 28, and the carrier $C'$, which at the same time is moved beyond the guideways 36 of the frame of the machine, is engaged by the grooves 37 of the heads 25. Meanwhile the rods $q$ ascend and raise the carrier $C'$, with the crown-supports $a'$, from the lower lengths of the chains to the upper lengths. Before reaching the upper lengths of the chains the heads 25 are pressed by the springs 29 outwardly against the guide-rods 26 and the lugs 30 and 31 slide on the guide-rods 26 during the upper movement of the rods $q$. In order to effectuate the disengagement of the heads 25 of the rods $q$ with the projecting ends 63 of the carrier $C'$, the guide-rods 26 are provided with recesses 38, which permit the projecting lugs 30 and 31 of the heads 25 to pass through the same. When near the end of the upward movement of the rods $q$, the pins 93 of the plates 39 of the conveying-chains $b$ engage with the projecting ends 63 of the crown-support carrier $C'$. In the meantime the rods $q$ have reached the limit of their upward movement to a height corresponding to the recesses 38 of the guide-rods 26, where, due to the action of the spring 29, the heads 25 of the rods $q$ are moved outwardly away from the chains $b$ to the position shown in dotted lines in Fig. 6 and disengage themselves from the carrier $C'$, which may then be moved along intermittently in the guideways 36 of the frame of the machine from the discharge end to the feed end. During the downward movement of the rods $q$ the lugs 30 and 31 of the heads 25 move along the guide-rods 26, on the outer side of the same, until the heads 25 encounter the springs 28, by means of which they are pressed against the guide-rods until they reach the recesses 38 at the lower part of the guide-rods 26 and are, due to the springs 28, pressed inwardly, so as to engage with the ends 63 of the carriers $C'$. The upward movement then takes place, as before described. By these means the engagement and disengagement of the heads 25 is quick and exact. A similar action takes place at the transferring device $f$ for raising the mantle-supporting rods $a$, and a similar action, but a descending one, takes place at the transferring device $h$ at the feed end of the machine, which transfers the crown-supports and mantle-supporting rods from the upper to the lower lengths of the chains. From the position 9, due to the next intermittent motion of the chains $b$, the mantles are moved through a partition D to the position 10, where they are immersed in a solution of collodion or other suitable liquid for giving the mantles the desired rigidity necessary for being manipulated and transferred with safety. A vessel $n$ is mounted on a support $n'$, attached to a frame $n^2$, to which is given a rectilinear vertical motion by means of a cam $n^3$, mounted on a shaft $n^4$ and on which is also mounted a gear-wheel $n^5$, with which meshes a worm $n^6$, mounted on the shaft $t$. The contour of the cam $n^3$ is so formed as to raise the vessel containing the impregnating liquid at the same moment when the mantles arrive at the position 10, so as to impregnate the mantles as long as they remain in that position and to descend the moment before the mantles are moved onwardly by the next intermittent motion of the chains $b$. From the position 10 the mantles are moved into the drying-chamber $r$, where the mantle-supporting rods $a$ are placed one against the other and move very slowly through the drying-chamber, so as to be thoroughly dried by the time they reach the discharge end of the machine. Here the carriers C, with the mantle-supporting rods $a$, are engaged by the elevating means $f$, similar to those described for elevating the crown-supports, whereby the mantle-supporting rods are raised from the lower length of the chains to the upper.

The drying-chamber $r$, not being a part of the present invention, is not described nor shown in detail.

The width of the machine may be of any desired dimension. By increasing the width of the machine and the number of mantle-supporting rods and crown-supports on the transverse carriers the capacity of the machine may be greatly increased. As several mantles are subjected to the same operations at the same time and the treatment of the mantles is such as to be accomplished entirely by the machine, my improved machine commends itself to those desiring means for a rapid and large production of mantles.

Having thus described our invention, we claim as new and desire to secure by Letters Patent—

1. A machine for making incandescent mantles, comprising a frame, guideways in said frame, mantle-supporting means movable in said guideways, means for burning, calcining, trimming and impregnating the mantles, a drying-chamber, and means for intermittently moving the mantle-supporting means for subjecting the mantles successively to the burning, calcining, trimming, impregnating and drying means, substantially as set forth.

2. In a machine for making incandescent mantles, the combination of a frame, guideways in said frame, mantle-supporting means movable in said guideways, pulleys supported at the ends of the machine, endless conveying-chains passing over said pulleys, means on said chains engaging the mantle-supporting means, means for intermittently moving said chains, and means for transferring the mantle-supporting means from one length of the chains to the other, substantially as set forth.

3. In a machine for making incandescent mantles, the combination, of a frame, guideways in said frame, transverse carriers movable in said guideways, mantle-supporting rods on some of said carriers, a plurality of crowns adapted to maintain the mantles in open position, crown-supports on the other carriers corresponding in number to the mantle-supporting rods, and means for intermittently moving said transverse carriers, substantially as set forth.

4. In a machine for making incandescent mantles, the combination, of a frame, guideways in said frame, mantle-supporting means movable in said guideways, means for intermittently moving said mantle-supporting means in said guideways, and a burning mechanism consisting of a plurality of adjustable burners adapted to be placed in proper relation to the mantles, substantially as set forth.

5. In a machine for making incandescent mantles, the combination, of a frame, guideways in said frame, mantle-supporting means movable in said guideways, means for intermittently moving the mantle-supporting means, a plurality of knives, and means for rapidly rotating said knives for cutting the mantles to the desired size, substantially as set forth.

6. In a machine for making incandescent mantles, the combination, with a frame, guideways in said frame, mantle-supporting means, means for intermittently moving the supporting means in said guideways, of a transverse support attached to said frame, a plurality of upright shafts on said support, sleeves movable on said shafts, knives on the upper end of said sleeves, helical springs, one end of each being fastened to each sleeve, while the other end of each spring is fastened to the transverse support, means for rotating said sleeves for placing the springs under tension, means for holding the springs in said position, and means for releasing said sleeves and springs for rapidly rotating the knives for cutting the mantles, substantially as set forth.

7. In a machine for making incandescent mantles, the combination, of interior and exterior calcining-burners, a supporting-frame for said burners, adjustable means carried on said frame, and means coöperating with said adjustable means for imparting a vertical reciprocal movement to said burners, substantially as set forth.

8. In a machine for making incandescent mantles, the combination, of a frame, guideways in said frame, mantle-supporting means movable in said guideways, means for imparting intermittent motion to mantle-supporting means in said guideways, and means for subjecting the mantles to a threefold successive heating action, substantially as set forth.

9. In a machine for making incandescent mantles, the combination, of a frame, guideways in said frame, mantle-supporting means movable in said guideways, means for imparting an intermittent motion to said mantle-supporting means, means for subjecting the mantles to a threefold successive preliminary heating action, and a plurality of internal and external calcining-burners for subjecting the mantles to a fourfold successive calcining action, substantially as set forth.

10. In a machine for making incandescent mantles, the combination, with a frame provided with guideways, of endless feed-chains adapted to have intermittent motion, plates on said chains arranged at certain distances apart on the inner circumference of said chains, pins on said chains, and transverse carriers engaged by the pins of the chains and moved intermittently in the guideways of the machine from one end of the machine to the other, substantially as set forth.

11. In a machine for making incandescent mantles, the combination, with a frame, guideways in said frame, pulleys at the ends of said frame and endless chains passing over said pulleys, of transverse carriers movable in the guideways of the frame, upright rods adapted to have vertical reciprocal motion, heads on said rods having grooves for engaging the ends of said transverse carriers, guide-rods for guiding said heads, and springs on said guide-rods for actuating said heads for engaging and releasing the ends of said carriers, substantially as set forth.

12. In a machine for making incandescent mantles, the combination, with a frame, guideways in said frame, pulleys at the ends of said frame and endless chains passing over said pulleys, of transverse carriers movable in the guideways of the frame, upright rods adapted to have vertical reciprocal motion, heads on said rods having grooves for engaging the ends of the transverse carriers, ways in the heads, lugs at the exterior side of said ways, guide-rods passing through said ways, recesses in said guideways level with the lower and upper lengths of the chains, and springs on said guide-rods actuating said heads for engaging and releasing the ends of said carriers, substantially as set forth.

In testimony whereof we have signed this specification in the presence of two subscribing witnesses.

JEAN LÉON MULLER.
JOSEPH BONNET.

Witnesses:
EMILE LEDRET,
EDWARD P. MACLEAN.